US012304047B2

(12) United States Patent
Xu et al.

(10) Patent No.: US 12,304,047 B2
(45) Date of Patent: May 20, 2025

(54) SAFETY FRAME TRAVEL ADJUSTMENT DEVICE FOR NAIL GUN

(71) Applicant: Zhejiang Rongpen Air Tools Co., Ltd., Zhejiang (CN)

(72) Inventors: Xuejun Xu, Zhejiang (CN); Zhonghua Jiang, Zhejiang (CN); Xiaorong Li, Zhejiang (CN); Xiaopeng Li, Zhejiang (CN); Fazheng Yang, Zhejiang (CN)

(73) Assignee: Zhejiang Rongpeng Air Tools Co., Ltd., Zhejiang (CN)

( * ) Notice: Subject to any disclaimer, the term of this patent is extended or adjusted under 35 U.S.C. 154(b) by 7 days.

(21) Appl. No.: 18/536,263

(22) Filed: Dec. 12, 2023

(65) Prior Publication Data

US 2025/0073878 A1 Mar. 6, 2025

(30) Foreign Application Priority Data

Aug. 31, 2023 (CN) ......................... 202322354410.3

(51) Int. Cl.
*B25C 1/04* (2006.01)
*B25C 5/16* (2006.01)
*B25C 7/00* (2006.01)
*B25C 1/00* (2006.01)
*B25C 1/08* (2006.01)

(52) U.S. Cl.
CPC .................. *B25C 7/00* (2013.01); *B25C 1/04* (2013.01); *B25C 1/047* (2013.01); *B25C 5/16* (2013.01); *B25C 1/005* (2013.01); *B25C 1/008* (2013.01); *B25C 1/08* (2013.01)

(58) Field of Classification Search
CPC ........... B25C 1/005; B25C 1/008; B25C 1/04; B25C 1/041; B25C 1/047; B25C 1/06; B25C 1/08; B25C 1/188; B25C 5/16
USPC ............................................... 227/8, 10, 142
See application file for complete search history.

(56) References Cited

U.S. PATENT DOCUMENTS 5,219,110 A * 6/1993 Mukoyama ............. B25C 1/008 227/8
5,261,587 A * 11/1993 Robinson .................. B25C 1/08 227/8
5,385,286 A * 1/1995 Johnson, Jr. ............ B25C 1/047 227/8
5,683,024 A * 11/1997 Eminger ................. B25C 1/003 227/128
5,839,638 A * 11/1998 Ronn .................... B25C 5/1637 227/8
6,024,267 A * 2/2000 Chen ....................... B25C 1/008 227/8

(Continued)

*Primary Examiner* — Scott A Smith

(57) ABSTRACT

A safety frame travel adjustment device for a nail gun, comprising a firing plate. The safety frame has a long slot machined into it. A positioning sleeve is fixed to the side of the firing plate and interacts with the long slot to ensure the safety frame can slide along the direction of the firing plate. Also on the side of the firing plate is a first spring that supports the safety frame. Additionally, an adjustment seat is fixed to the side of the firing plate, housing an adjustment component for modifying the position of the safety frame. This adjustment component consists of a connecting bolt, a threaded sleeve, an adjustment wheel, and an opening and closing rod. The connecting bolt is secured to the safety frame with a locking nut and is threadedly connected to the threaded sleeve.

4 Claims, 5 Drawing Sheets

(56) References Cited

U.S. PATENT DOCUMENTS

| | | | | |
|---|---|---|---|---|
| 6,170,729 | B1 * | 1/2001 | Lin | B25C 1/008 227/8 |
| 6,581,815 | B1 * | 6/2003 | Ho | B25C 1/008 227/8 |
| 6,851,595 | B1 * | 2/2005 | Lee | B25C 1/008 227/8 |
| 6,857,547 | B1 * | 2/2005 | Lee | B25C 1/008 227/8 |
| 7,097,084 | B2 * | 8/2006 | Ho | B25C 1/008 227/8 |
| 7,318,546 | B2 * | 1/2008 | Segura | B25C 1/008 227/8 |
| 7,341,172 | B2 * | 3/2008 | Moore | B25C 1/008 227/8 |
| 7,431,187 | B2 * | 10/2008 | Tachihara | B25C 1/008 227/140 |
| 7,874,469 | B2 * | 1/2011 | Liu | B25C 1/008 227/8 |
| 8,336,748 | B2 * | 12/2012 | Hlinka | B25C 1/008 227/8 |
| 8,464,806 | B2 * | 6/2013 | Rousson | B25C 1/008 173/114 |
| 8,479,963 | B2 * | 7/2013 | Kitagawa | B25C 1/008 227/8 |
| 8,746,526 | B2 * | 6/2014 | Hlinka | B25C 1/008 227/8 |
| 9,126,318 | B2 * | 9/2015 | Cheung | B25C 1/008 |
| 11,607,786 | B2 * | 3/2023 | Peng | B25C 1/188 |
| 11,759,930 | B2 * | 9/2023 | Jiang | B25C 1/06 227/8 |
| 2004/0238593 | A1 * | 12/2004 | Tachihara | B25C 1/008 227/142 |
| 2007/0057006 | A1 * | 3/2007 | Moore | B25C 1/008 227/8 |
| 2007/0090149 | A1 * | 4/2007 | Segura | B25C 1/008 227/8 |
| 2008/0023516 | A1 * | 1/2008 | Chang | B25C 1/008 227/8 |
| 2008/0099525 | A1 * | 5/2008 | Brendel | B25C 1/06 227/8 |
| 2009/0001119 | A1 * | 1/2009 | Osuga | B25C 1/008 227/10 |
| 2010/0237125 | A1 * | 9/2010 | Jang | B25C 1/008 227/8 |
| 2010/0327037 | A1 * | 12/2010 | Zhang | B25C 1/008 227/8 |
| 2012/0305624 | A1 * | 12/2012 | Liao | B25C 1/188 227/142 |
| 2013/0082084 | A1 * | 4/2013 | Mandel | B25C 1/06 227/8 |
| 2013/0119107 | A1 * | 5/2013 | Cheung | B25C 1/188 227/139 |

* cited by examiner

SAFETY FRAME TRAVEL ADJUSTMENT DEVICE FOR NAIL GUN

FIELD OF THE INVENTION

This present invention pertains to a safety frame travel adjustment device for a nail gun.

BACKGROUND OF THE INVENTION

A nail gun is a device used for driving nails, primarily in construction and decoration industries. The safety frame is a component that alters the depth of nail driving by changing its position. Adjustment of the safety frame is facilitated by a safety frame adjustment device, operated simply by turning a tuning wheel, as disclosed in patent CN218856867U. Traditional safety frame adjustment structures have issues like large operational gaps, susceptibility to deformation, and risk of becoming stuck over time, indicating a need for structural optimization.

SUMMARY OF THE INVENTION

Addressing the deficiencies in existing solutions, this present invention introduces a safety frame travel adjustment device for a nail gun.

To achieve the aforementioned objective, this present invention provides a safety frame travel adjustment device for a nail gun, comprising a firing plate. The front end of the firing plate is equipped with a safety frame, which is processed to form a long slot. A positioning sleeve fixed to the side of the firing plate interacts with the long slot to ensure the safety frame slides in the direction of the firing plate. The side of the firing plate is also equipped with a first spring supporting the safety frame. Additionally, an adjustment seat is fixed to the side of the firing plate, housing an adjustment component for altering the position of the safety frame. This adjustment component includes a connecting bolt, a threaded sleeve, an adjustment wheel, and an opening and closing rod. The connecting bolt is secured to the safety frame with a locking nut, and the threaded sleeve is screwed onto the connecting bolt via internal threads. The adjustment wheel, fitted on the outer side of the threaded sleeve, can rotate it synchronously. The adjustment seat is designed to limit axial movement of the adjustment wheel, with part of the wheel protruding outside the seat. The opening and closing rod, coaxially aligned with the connecting bolt, has a support ring at its midpoint, with a second spring and a third spring positioned on either side of this ring. The second spring, located on the side of the support ring opposite the threaded sleeve, acts between the support ring and an internal wall of the adjustment seat through a spacer. The third spring acts between the support ring and the internal wall of the threaded sleeve. Additionally, the adjustment seat includes a second limit part to restrict the axial maximum displacement of the threaded sleeve.

Moreover, a shock-absorbing spacer is fitted on the outer side of the threaded sleeve to mitigate impacts on the adjustment wheel.

Additionally, the adjustment wheel's side surface is processed to form multiple positioning slots evenly distributed in a circular pattern. The adjustment seat houses a positioning steel ball and a fourth spring supporting it, with the steel ball, under the action of the fourth spring, tightly fitting into one of the positioning slots.

Furthermore, the adjustment seat comprises a first seat body and a second seat body, which are fixedly connected and joined to the firing plate through connectors.

Moreover, the device includes a micro switch, positioned along the motion path of the opening and closing rod.

Beneficial Effects Compared to Existing Technology: The present invention offers a compact and rational design. Its layout on the nail gun is more reasonable, with reduced gaps and increased strength, making it less prone to deformation. The reliability is enhanced, eliminating the risk of sticking, and preventing functional loss of the nail gun due to issues with the safety frame.

DETAILED DESCRIPTION OF THE EMBODIMENTS

Figure 1:
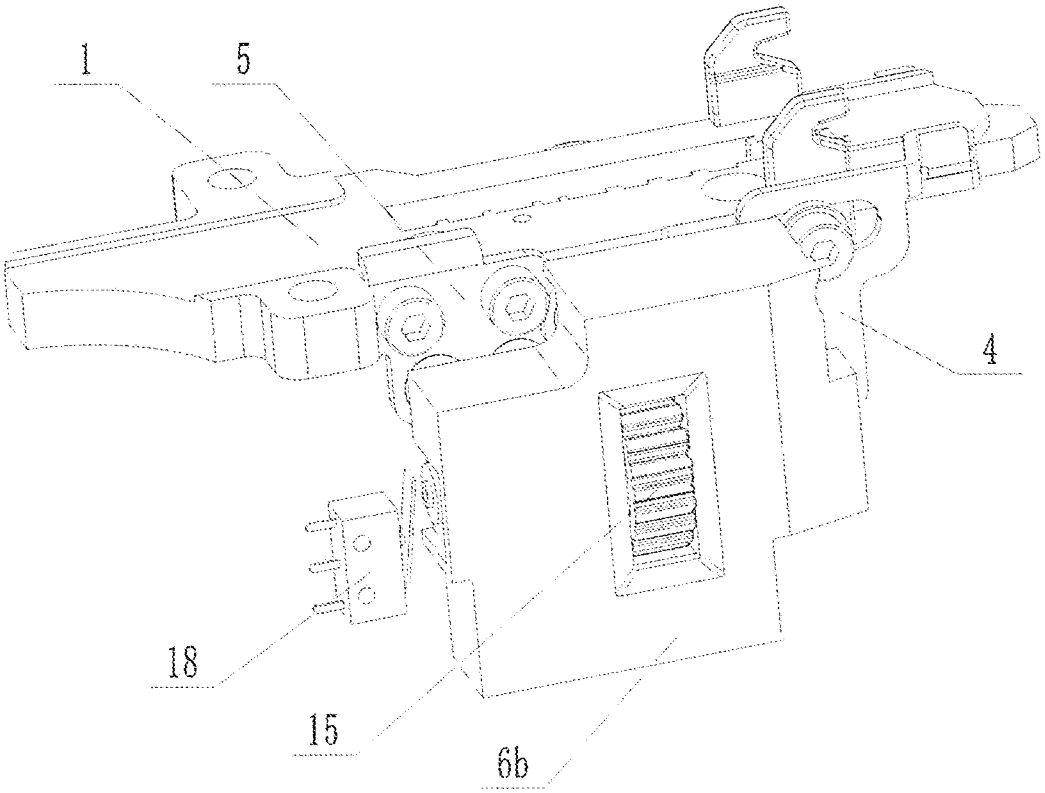
FIG. 1 is a three-dimensional view of a safety frame travel adjustment device for a nail gun in accordance with this present invention.

As shown in FIGS. 1-5, this embodiment of a safety frame travel adjustment device for a nail gun includes a firing plate (1), with a safety frame (4) located at the front end of the firing plate. The safety frame (4) is processed to form a long slot (41). A positioning sleeve (3), whose dimensions match with the long slot (41), is fixed to the side of the firing plate (1). This interaction allows the safety frame (4) to slide in the direction of the firing plate. The side of the firing plate (1) also has a first spring (2) supporting the safety frame (4), and an adjustment seat (6) is fixed to the side. Inside the adjustment seat (6) is an adjustment component for altering the position of the safety frame (4). This component includes a connecting bolt (13), a threaded sleeve (12), an adjustment wheel (15), and an opening and closing rod (9). The connecting bolt (13) is secured to the safety frame (4) with a locking nut (14). The threaded sleeve (12) is connected to the connecting bolt (13) via internal threads and is shaped with a non-circular cross-section at the top and bottom, allowing it to move axially relative to the adjustment wheel (15), which is fitted on the outside of the threaded sleeve (12) and can rotate it synchronously. The adjustment seat (6) includes a first limit part (61) to restrict axial movement of the adjustment wheel (15), which partially extends outside the adjustment seat. The opening and closing rod (9), coaxially aligned with the connecting bolt (13), has a support ring (91) at its midpoint, with a second spring (8) and a third spring (10) positioned on either side. The second spring (8) acts between the support ring (91) and an inner wall of the adjustment seat (6) through a spacer (7), while the third spring (10) acts between the support ring (91) and the inner wall of the threaded sleeve (12). The adjustment seat (6) also includes a second limit part (62) to restrict the axial maximum displacement of the threaded sleeve (12). A shock-absorbing spacer (11) is fitted on the outside of the threaded sleeve (12) to mitigate impacts on the adjustment wheel (15). The adjustment wheel (15) has several positioning slots (151) evenly distributed in a circular pattern on one of its side surfaces. Inside the adjustment seat (6) are a positioning steel ball (16) and a fourth spring (17) supporting it. The steel ball (16), under the pressure of the fourth spring (17), fits tightly into one of the positioning slots (151), providing a sense of position during adjustment and ensuring stability of the adjustment wheel (15). The adjustment seat (6) includes a first seat body (6*a*) and a second seat body (6*b*), which are fixedly connected and joined to the firing plate (1) through connectors (5). This split design facilitates the installation of the adjustment components inside the adjustment seat (6). The device also includes a micro switch (18), positioned along the motion path of the opening and closing rod (9). Movement of the safety frame (4) can trigger the micro switch (18), sending a signal. This signal, along with the trigger action signal of the nail gun, collectively controls the operation of the nail gun, preventing dry firing and potential safety incidents.

The structure of this device is compact and well-designed, offering an optimized layout when mounted on a nail gun. It has small operational gaps, enhanced strength, is not prone to deformation, and exhibits high reliability without the risk of sticking. This increased reliability prevents the loss of nail gun functionality due to issues with the safety frame.

Figure 2:
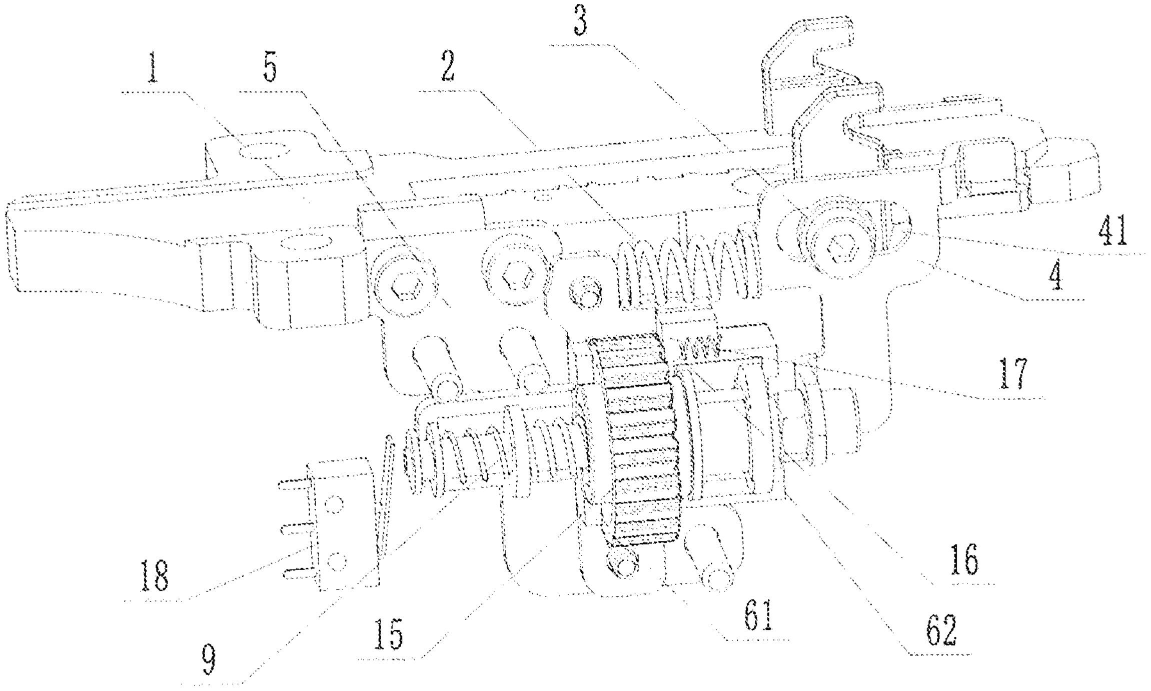
FIG. 2 is a schematic diagram of the adjustment component within the adjustment seat.
Figure 3:
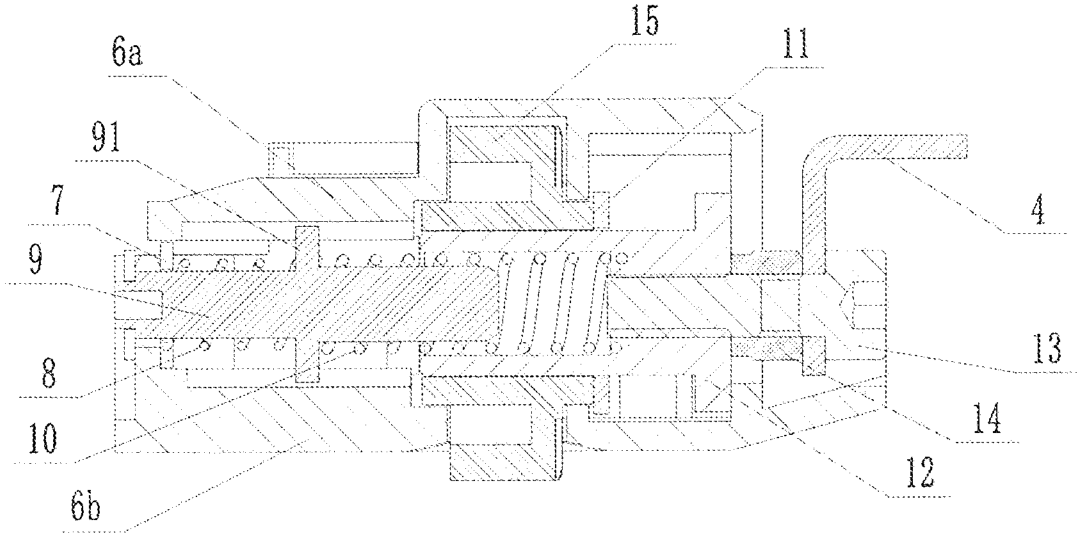
FIG. 3 is a cross-sectional view of the adjustment component within the adjustment seat.
Figure 4:
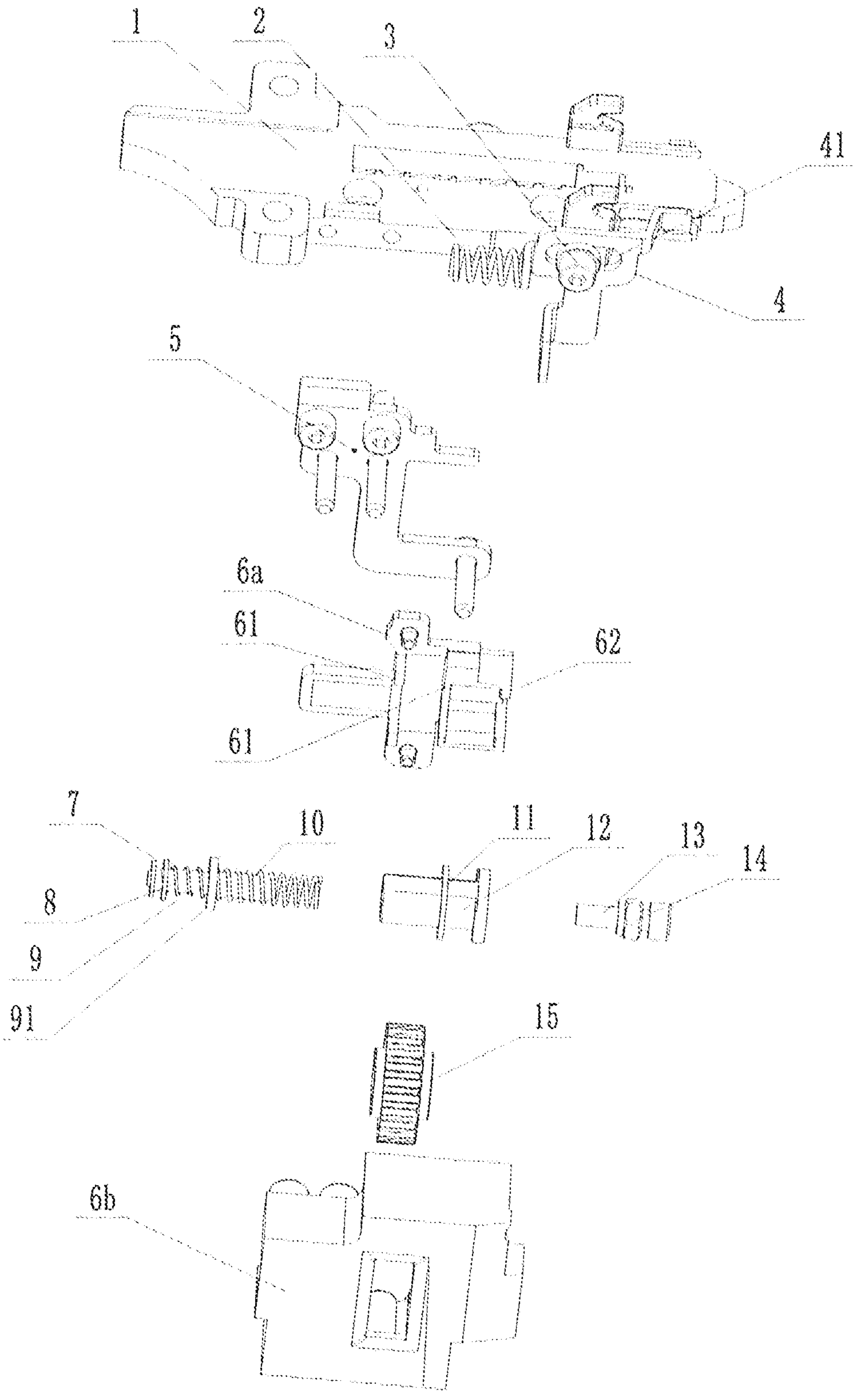
FIG. 4 is an exploded view of the safety frame travel adjustment device for a nail gun in this present invention.
Figure 5:
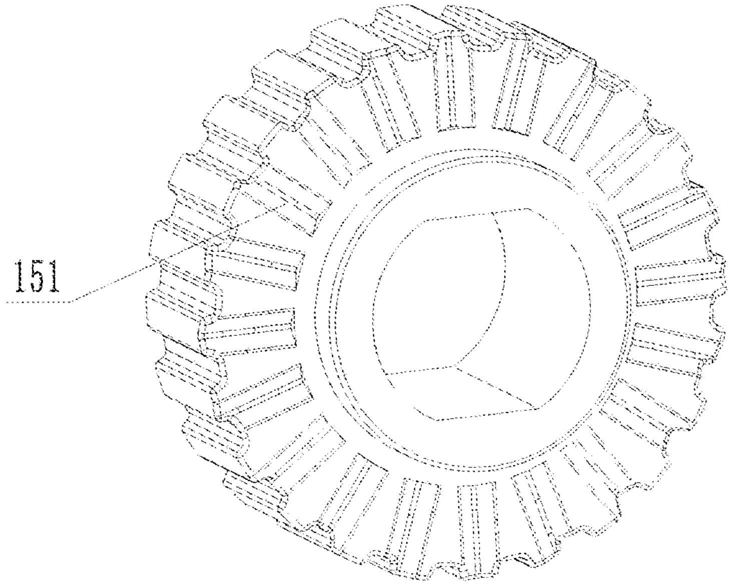
FIG. 5 is a schematic diagram of the involved adjustment wheel.

For a better understanding of this present invention in practical use, let's describe its operation in conjunction with the attached drawings:

Referring to FIGS. 2 and 3, when it's necessary to adjust the position of the safety frame (4), the adjustment wheel (15) is turned. This causes the threaded sleeve (12) to rotate synchronously with the adjustment wheel (15). The threaded sleeve (12) is threadedly connected to the connecting bolt (13), which moves axially relative to the threaded sleeve (12). Since the connecting bolt (13) is fixedly connected to the safety frame (4), this results in the synchronous axial movement of the safety frame (4), thereby adjusting its position. During nailing, the safety frame (4) abuts the surface of the object, and its movement causes the threaded sleeve (12) to move axially relative to the adjustment wheel (15) (to the left). This movement is transferred through the third spring (10) and the second spring (8) to the opening and closing rod (9), bringing it closer to the micro switch (18). This contact with the micro switch (18) completes a circuit, enabling nail firing control.

The above description is just a preferred embodiment of this present invention and is not intended to limit its scope. For those skilled in the art, various changes and modifications can be made within the spirit and principles of this present invention. Any modifications, equivalent substitutions, improvements, etc., made within the essence and principles of this present invention should be included within its scope of protection.

We claim:

1. A safety frame travel adjustment device for a nail gun, comprising a firing plate (1), wherein a front end of the firing plate (1) is equipped with a safety frame (4); the safety frame (4) is processed to form a long slot (41); a positioning sleeve (3) is fixed to one side of the firing plate (1), and interacts with the long slot (41) to ensure the safety frame (4) slides along the direction of the firing plate (1);

a side of the firing plate (1) also includes a first spring (2) supporting the safety frame (4);

the side of the firing plate (1) further includes an adjustment seat (6), within which is housed an adjustment component for adjusting the position of the safety frame (4);

the adjustment component comprises a connecting bolt (13), a threaded sleeve (12), an adjustment wheel (15), and an opening and closing rod (9);

the connecting bolt (13) is secured to the safety frame (4) with a locking nut (14); the threaded sleeve (12) is threadedly connected to the connecting bolt (13) and the adjustment wheel (15) is fitted on an outer side of the threaded sleeve (12), capable of driving the threaded sleeve (12) to rotate synchronously;

the adjustment seat (6) includes a first limit part (61) to restrict axial movement of the adjustment wheel (15), with part of the wheel extending outside the adjustment seat (6);

the opening and closing rod (9), coaxially aligned with the connecting bolt (13), has an integral support ring (91) at midpoint of the opening and closing rod (9), flanked by a second spring (8) and a third spring (10);

the second spring (8) is positioned on one side of the support ring (91) opposite to the threaded sleeve (12), acting between the support ring (91) and an inner wall of the adjustment seat (6) via a spacer (7);

the third spring (10) acts between the support ring (91) and an inner wall of the threaded sleeve (12) the adjustment seat (6) further includes a second limit part (62) to restrict the axial maximum displacement of the threaded sleeve (12).

2. The safety frame travel adjustment device for the nail gun according to claim 1, wherein a shock-absorbing spacer (11) is fitted on the outer side of the threaded sleeve (12) to mitigate impacts on the adjustment wheel (15).

3. The safety frame travel adjustment device for the nail gun according to claim 1, wherein the adjustment wheel (15) has a plurality of positioning slots (151) evenly distributed in a circular pattern on one of its side surfaces; inside the adjustment seat (6) are positioned a positioning steel ball (16) and a fourth spring (17) supporting the steel ball; the positioning steel ball (16), under the action of the fourth spring (17), fits tightly into one of the positioning slots (151).

4. The safety frame travel adjustment device for the nail gun according to claim 1, wherein the adjustment seat (6) comprises a first seat body (6*a*) and a second seat body (6*b*) that are fixedly connected, the first seat body (6*a*) and the second seat body (6*b*) are joined to the firing plate (1) through connectors (5).

* * * * *